(12) United States Patent
Miki et al.

(10) Patent No.: US 8,685,517 B2
(45) Date of Patent: Apr. 1, 2014

(54) OPTICAL RECORDING MEDIUM

(75) Inventors: Takeshi Miki, Tokyo (JP); Manami Miyawaki, Tokyo (JP); Yuki Tauchi, Tokyo (JP)

(73) Assignees: Sony Corporation, Tokyo (JP); Kabushiki Kaisha Kobe Seiko Sho, Hyogo (JP)

( * ) Notice: Subject to any disclaimer, the term of this patent is extended or adjusted under 35 U.S.C. 154(b) by 0 days.

(21) Appl. No.: 13/640,812

(22) PCT Filed: Apr. 6, 2011

(86) PCT No.: PCT/JP2011/002036
§ 371 (c)(1),
(2), (4) Date: Nov. 15, 2012

(87) PCT Pub. No.: WO2011/132371
PCT Pub. Date: Oct. 27, 2011

(65) Prior Publication Data
US 2013/0052389 A1 Feb. 28, 2013

(30) Foreign Application Priority Data

Apr. 19, 2010 (JP) ................................. 2010-095883
Feb. 3, 2011 (JP) ................................. 2011-022171

(51) Int. Cl.
*G11B 7/24* (2013.01)

(52) U.S. Cl.
USPC ..................... 428/64.1; 428/64.4; 430/270.12

(58) Field of Classification Search
USPC .................................... 428/64.4; 430/270.12
See application file for complete search history.

(56) References Cited

U.S. PATENT DOCUMENTS

| 8,361,586 | B2 | 1/2013 | Miki et al. | |
| 2011/0044157 | A1* | 2/2011 | Miki et al. | 369/283 |
| 2011/0069602 | A1* | 3/2011 | Miki | 369/283 |
| 2011/0216643 | A1* | 9/2011 | Tauchi et al. | 369/283 |
| 2012/0176883 | A1* | 7/2012 | Tauchi et al. | 369/283 |

FOREIGN PATENT DOCUMENTS

| JP | 63-046635 A | 2/1988 |
| JP | 2005-178085 A | 7/2005 |
| WO | 2010/055865 A1 | 5/2010 |
| WO | 2011/034153 A1 | 3/2011 |

* cited by examiner

*Primary Examiner* — Elizabeth Mulvaney
(74) *Attorney, Agent, or Firm* — Wolf, Greenfield & Sacks, P.C.

(57) ABSTRACT

[Object] To provide an optical recording medium that can be applied to a write-once optical recording medium having a high capacity of about 25 GB per one layer, and has good recording properties when a multilayered recording layer configuration is provided.

[Solving Means] It includes a substrate 21 and two to four recording layers 221 and 222. At least one or more of these recording layers 221 and 222 are specific recording layers with a composition containing PdO and $PdO_2$ as well as at least one of completely oxidized In, Zn, Al and Sn (in other words, $In_2O_3$, ZnO, $Al_2O_3$ and $SnO_2$). Adjacent to the specific recording layers, dielectric layers 232*a* and 232*b* of In/Al oxide layers containing at least either of In or Al as a main component are disposed.

19 Claims, 8 Drawing Sheets

OPTICAL RECORDING MEDIUM

CROSS-REFERENCE TO RELATED APPLICATION

The present application claims the benefit of and priority to PCT Application Ser. No. PCT/JP2011/002036, filed Apr. 6, 2011, the entire content of which is incorporated by reference herein.

TECHNICAL FIELD

The present invention relates to an optical recording medium such as an optical disc, more particularly to an optical recording medium that can record with high recording density.

BACKGROUND ART

In recent years, as a high capacity optical disc, a Blu-ray Disc™ (BD) (hereinafter referred to as "high capacity optical disc") has been commercially available. The high capacity optical disc realizes a recording capacity of about 25 GB with a light wavelength for recording and reproducing of about 405 nm and a numerical aperture NA of about 0.85 of a collecting lens for a recording and reproducing optical system.

In the high capacity optical disc type optical recording medium, a wide variety of write-once recording layer materials have been considered. As the conventional write-once optical disc recording layer materials, organic dye materials are known. Meanwhile, in order to improve the productivity of the use of the organic dye materials and a problem concerning long-term storage stability of recording signals, a wide variety of inorganic materials used for the write-once recording layer materials have been considered. For example, Patent Document 1 below proposes an optical recording medium having a recording layer including Te—O or the like that is crystallized at a high speed with rising temperature and generates an optical change.

Patent Document 1: Japanese Unexamined Patent Application Publication No. 2008-112556

DISCLOSURE OF THE INVENTION

Problem to be Solved by the Invention

In the meantime, in the high capacity optical disc type write-once optical recording medium as described above, in order to further increase the capacity, multilayering has been proceeded. As to a monolayer high capacity optical disc, an adequate range regarding recording properties such as jitter, a modulation degree, an error rate and the like is specified. It is necessary that the recording properties within the range are satisfied in the multilayer medium, too.

In view of the problems as described above, an object of the present invention is to provide an optical recording medium that can be used as the above-mentioned high capacity optical disc type write-once optical recording medium, inhibits a decrease in recording properties caused by multilayering, and has the recording properties comparable to a monolayer recording layer configuration.

Means for Solving the Problem

The optical recording medium of the present invention includes a substrate and two to four recording layers, in which at least one or more of the recording layers are specific recording layers having a composition containing $PdO$, $PdO_2$ and at least one of completely oxidized In, Zn, Al and Sn (in other words, $In_2O_3$, $ZnO$, $Al_2O_3$ and $SnO_2$). Adjacent to the specific recording layers, In/Al oxide layers containing at least either In or Al as a main component are disposed.

"At least either In or Al is a main component" herein includes an oxide layer containing In as a main component, an oxide layer containing Al as a main component, or an oxide layer containing both In and Al as a main component.

As described above, the optical recording medium of the present invention has a multilayer configuration including two to four recording layers, in which at least one or more recording layers are specific recording layers having a composition containing $PdO$ and $PdO_2$. When the specific recording layers are irradiated with laser light, other stable oxides such as $In_2O_3$ and $Al_2O_3$ are not reacted, but $PdO$ and $PdO_2$ are reacted. In other words, by irradiation of recording light, a reaction takes place so that $PdO$ is decomposed into $Pd$ and $O_2$, and $PdO_2$ is decomposed into $PdO$ and $O_2$. When $O_2$ is generated, it will provide a configuration that a flat thin film recording layer is inflated. As a result, at a position the recording light is irradiated, a recording mark having a reflectance that is different from that of surrounding area is formed.

In addition, the specific recording layers contain at least one of completely oxidized In, Zn, Al and Sn in addition to $PdO$ and $PdO_2$. With such a configuration, transmittance can be accurately controlled by adjusting a composition ratio. For example, when the composition ratio of Zn increases, the transmittance decreases. When the composition ratio of Al increases, the transmittance increases. When the composition ratio of Pd increases, the transmittance significantly decreases. Conversely, when the composition ratio of Pd decreases, the transmittance tends to significantly increase. By utilizing a change in the transmittance by the composition ratio, the transmittance of the recording layers can be advantageously adjusted easily and accurately.

In the optical recording medium according to the present invention, adjacent to the specific recording layers, the In/Al oxide layers containing at least either In or Al as a main component are disposed. When the oxide layers are disposed at an opposite side of the light incident side of the specific recording layers, a recording power margin becomes wider. On the other hand, when they are disposed at the light incident side, it is possible to individually adjust total reflectance and transmittance including the specific recording layers by adjusting the thicknesses of the oxide layers. Therefore, adjacent to either top or bottom of the specific recording layers, the In/Al oxide layers are disposed, thereby providing a multilayered recording medium having good recording properties. This will enable the high capacity optical disc type optical recording medium to have two to four multilayered recording layers.

Effect of the Invention

The present invention can provide a high capacity optical disc write-once type optical recording medium having a multilayered recording layer configuration that has the recording properties similar to a monolayer recording layer configuration.

BEST MODE(S) FOR CARRYING OUT THE INVENTION

Preferred embodiments for carrying out the present invention (hereinafter referred to as embodiments) will be described.

The embodiments will be described in the following order.
1. Configuration of Optical Recording Medium (embodiments of configurations having two-, three- and four-layered recording layers)
2. Reference Embodiments (recording properties of an optical recording medium in a monolayer configuration including only one specific recording layer)
3. Embodiments (recording properties of embodiments of configurations having two-, three- and four-layered recording layers)

<1. Configuration of Optical Recording Medium>
[Construction of Optical Recording Medium]

Figure 1:
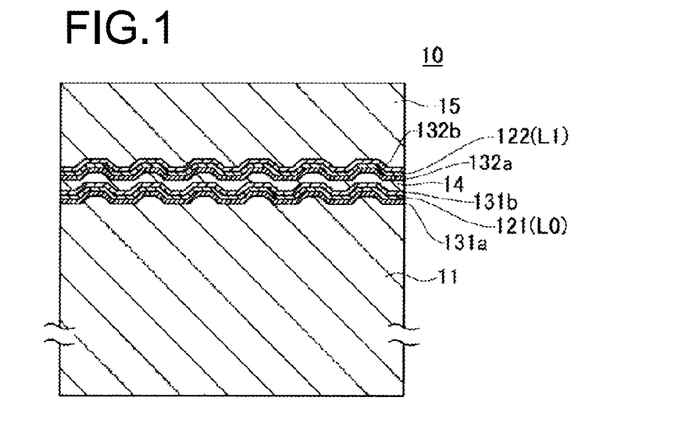
[FIG. 1] A schematic cross-sectional configuration view of an optical recording medium according to an embodiment of the present invention.

FIG. 1 is a schematic cross-sectional configuration view of an optical recording medium 10 according to an embodiment of the present invention. As shown in FIG. 1, in the optical recording medium 10, two recording layers 121 (L0) and 122 (L1) are formed on a substrate 11. In the multilayer recording medium, the recording layer nearest the substrate generally denotes L0, then, L1, L2, . . . , which will be sequentially as a matter of convenience.

When the optical recording medium 10 of the present embodiment is configured as the above-mentioned high capacity optical disc (Blu-ray Disc™) type, a disc-shaped substrate 11 having a thickness of about 1.1 mm and an outside diameter of about 120 mm is used. On a surface thereof, for example, a surface on which a concavo-convex portion is formed as a wobbling groove, recording layers 121 and 122 are formed via an intermediate layer 14 made of a light permeable material. On top or bottom, or adjacent to top and bottom shown in the drawing, of the respective recording layers 121 and 122, dielectric layers 131a and 131b, 132a and 132b are disposed. The dielectric layers may be disposed adjacent to either top or bottom. At least one of these recording layers 121 and 122, preferably the recording layer 122 at light incident side contains PdO and PdO$_2$. The specific recording layers have a composition containing at least one of completely oxidized In, Zn, Al and Sn (in other words, In$_2$O$_3$, ZnO, Al$_2$O$_3$ and SnO$_2$). At least any one of the dielectric layers 131a, 131b, 132a, and 132b adjacent to the top and bottom of the specific recording layers is configured to be In/Al oxide layers containing In or Al as a main component.

Further, on a top of the recording layer 122, a protective layer 15 made of a light permeable material is formed. The thickness of the protective layer 15 is selected so that the sum of the thicknesses of the layers above the recording layer 121 is about 100 μm. A total thickness including the substrate 11 is 1.2 mm. In the high capacity optical disc type configuration, the light incident side for recording is the protective layer 15 side. It should be noted that the present invention is not limited to the high capacity optical disc type configuration. The substrate having a card shape or the like, not a disc shape, can be used. The thickness of the substrate 11 or the protective layer 15 and an outside diameter in a case where the substrate has a disc shape can be selected depending on the applications, as appropriate.

Figure 2:
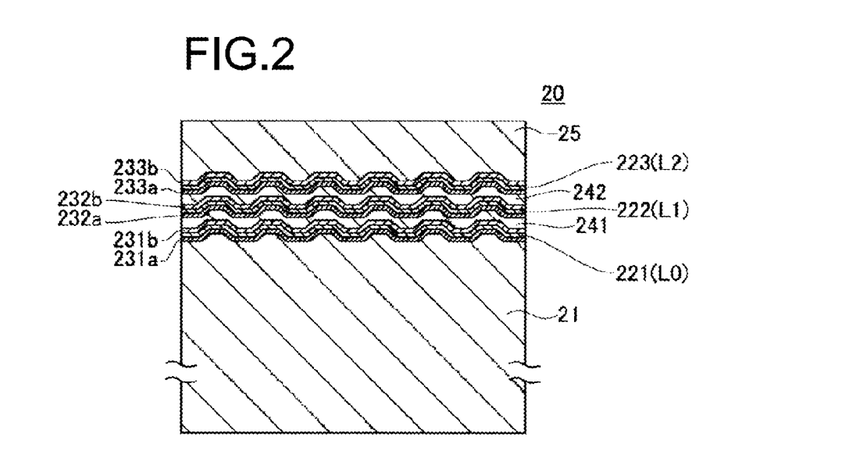
[FIG. 2] A schematic cross-sectional configuration view of an optical recording medium according to another embodiment of the present invention.
Figure 3:
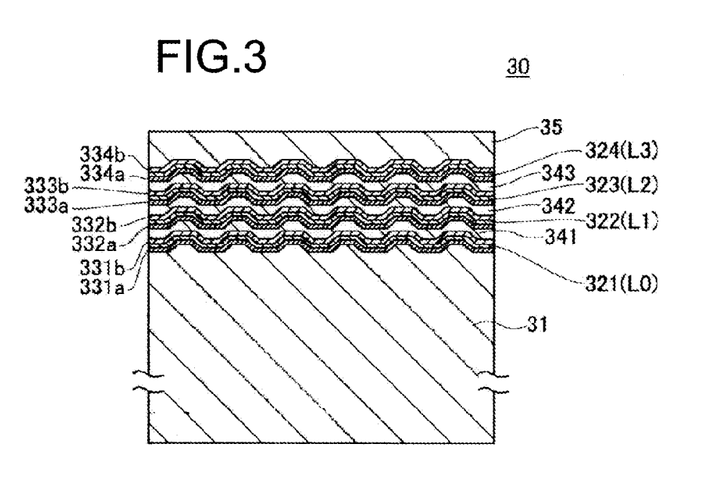
[FIG. 3] A schematic cross-sectional configuration view of an optical recording medium according to another embodiment of the present invention.

FIG. 2 and FIG. 3 are schematic cross-sectional configuration views of optical recording media 20 and 30 according to another embodiment of the present invention.

The embodiment shown in FIG. 2 shows the configuration of the optical recording medium 20 having the recording layers in a three-layered configuration. In this embodiment, the concavo-convex portion is formed as a wobbling groove on a substrate 21 as in the embodiment shown in FIG. 1. On the surface on which the concavo-convex portion is formed, recording layers 221 (L0), 222 (L1) and 223 (L2) are formed in order from the substrate 21 side via intermediate layers 241 and 242. In the embodiment shown, dielectric layers 231a and 231b, 232a and 232b, and 233a and 233b are disposed adjacent to either top or bottom of the recording layers 221, 222 and 223, respectively. At least any one of the recording layers 221 to 223, preferably at least either the recording layers 222 or 223 is configured as the specific recording layer having the above-mentioned composition. Also, at least any one of the dielectric layers adjacent to the top and bottom of the specific recording layers is configured to be an In/Al oxide layer. On a top of the recording layer 223 (L2), a protective layer 25 is formed. As in the embodiment shown in FIG. 1, in the high capacity optical disc type configuration, the outside diameter and the thickness of the substrate layer 21 and the thickness of the protective layer 25 are preferably similar to those of the embodiment shown in FIG. 1.

The embodiment shown in FIG. 3 shows the configuration of an optical recording medium 30 having the recording layers in a four-layered configuration. In this embodiment, the concavo-convex portion is formed as a wobbling groove on a substrate 31 as in the embodiment shown in FIG. 1. On the surface on which the concavo-convex portion is formed, recording layers 321 (L0), 322 (L1), 323 (L2) and 324 (L3) are formed in order from the substrate 31 side via intermediate layers 341, 342 and 343. In addition, dielectric layers 331a and 331b, 332a and 332b, 333a and 333b, and 334a and 334b are disposed adjacent to either top or bottom of the recording layers 321 to 324. Also in this case, at least any one of the recording layers 321 to 324, preferably at least any one of the recording layers 322 to 324 is configured to be the specific recording layer having the above-mentioned composition. Also, at least any one of the dielectric layers adjacent to the top and bottom of the specific recording layers is configured to be an In/Al oxide layer. On a top of the recording layer 324 (L3), a protective layer 35 is formed. Also in this case, as in the embodiment shown in FIG. 1, in the high capacity optical disc type configuration, the thickness and the outside diameter of the substrate layer 31 and the thickness of the protective layer 35 are preferably similar to those of the embodiment shown in FIG. 1.

Next, configurations, materials, and the like applicable to each of the substrate, the recording layer, the intermediate layer and the protective layer in the optical recording medium according to each embodiment shown in FIGS. 1 to 3 will be described.

[Configuration of Substrate]

The substrate 11 (21, 31) is made of a material, such as for example, a polycarbonate resin, and formed by injection molding or the like to transfer a concavo-convex shape of a wobbling groove for tracking from a master. It should be noted that in the optical recording medium of the present invention, the groove shape is not essential, and any configuration that enables tracking and appropriately inhibits a cross talk between recording tracks may be used. Furthermore, the recording tracks can be on the groove or on the land at a light incident side, and can adopt any recording mode.

[Material of Recording Layer]

In this embodiment, at least one or more of the recording layers, for example, the recording layers 122, 223, 324 and the like contain PdO and $PdO_2$ as described above, and configure specific recording layers having a composition containing at least one of completely oxidized In, Zn, Al and Sn.

When the specific recording layer is irradiated with laser light, for example, having a center wavelength of around 405 nm, PdO is decomposed into Pd and $O_2$, and $PdO_2$ is decomposed into PdO and $O_2$. When $O_2$ is generated, a structural inflation occurs. As a result, a recording mark having a reflectance that is different from that of surrounding area is formed.

The specific recording layers should contain at least one of completely oxidized In, Zn, Al and Sn, i.e., at least one of $In_2O_3$, ZnO, $Al_2O_3$ and $SnO_2$. As described above, when the composition ratio of Zn increases, the transmittance decreases. When the composition ratio of Al increases, the transmittance increases. When the composition ratio of Pd increases, the transmittance significantly decreases. Adversely, when the composition ratio of Pd decreases, the transmittance tends to significantly increase. By utilizing the change in the transmittance depending on the composition ratio, the transmittance of the recording layer can be adjusted easily and accurately. Consequently, when the recording layers have a multilayer configuration, any one of the recording layers is the specific recording layer, thereby providing a high capacity optical disc type multilayered optical recording medium having good recording properties.

In other words, the specific recording layer is not required to be applied to all of the two to four multilayered recording layers. In particular, the specific recording layer is preferably disposed on one or more of the recording layers at a light incident side. For example, in a two-layered configuration, only the second recording layer 122 (L1) may be the specific recording layer. In a three-layered configuration, either the second recording layer 222 or the third recording layer 223, or the second and third recording layers 222 and 223 can be the specific recording layer(s). In a four-layered configuration, any one of the second, third and fourth recording layers 322, 323 and 324 may be the specific recording layer. Also, either the second and the third recording layers 322 and 323 or the third and fourth recording layers 323 and 324 may be the specific recording layers. In addition, all of the second to fourth recording layers 322 to 324 may be the specific recording layers.

On the other hand, the recording layer at an opposite side of the light incident side, i.e., the recording layer 121 (or 221 or 321, L0) disposed nearest the substrate 11 (21, 31) in the high capacity optical disc, may not configure the specific recording layer and may be made of other materials. Non-limiting examples of other materials include any materials that can provide the recording layer in the multilayered recording layer configuration with good recording properties. For example, it is also possible to form the recording layer made of other write-once recording material or a re-writable recording material, or to form a read-only recording layer.

Also, the specific recording layer may contain an incomplete oxide including an element other than the element included in the complete oxide of In, Zn, Al or Sn. In either case, in terms of the productivity, it is preferable that the recording layer can be formed of the materials utilizing a common film forming apparatus.

As materials applicable to the recording layer excluding the specific recording layer, recording layer materials including PdO and $PdO_2$ can be cited, for example. In this case, at least any one of Zn, In and Sn is preferably included. In other words, any one of Zn—Pd—O, In—Pd—O, Sn—Pd—O can be included. Also, any one of Zn—In—Pd—O, Zn—Sn—Pd—O, In—Sn—Pd—O, Zn—In—Sn—Pd—O may be included. In any case, the transmittance is less affected and no significant change is made in the recording properties. O is used in a larger amount than stoichiometric composition of completely oxidized Zn, In or Sn (ZnO, $In_2O_3$, $SnO_2$). This allows the recording layer to include PdO or $PdO_2$, as described above. It can provide the high capacity optical disc type configuration having good recording properties. The recording layer can be formed using a common film forming apparatus for the above-mentioned specific recording layer, which is preferable in terms of the productivity. It should be noted that an "element-O" herein means a material containing an element and oxygen, and includes a compound containing the element and oxygen, and an oxide of the element (not necessarily complete oxidation).

Also, the In/Al oxide layers disposed adjacent to the top and/or bottom of the specific recording layers may contain other dielectric materials. Examples of other materials include oxides (they are not limited to complete oxides) such as Zn—O, Sn—O, Ga—O, Si—O, Ti—O, V—O, Cr—O, Nb—O, Zr—O, Hf—O, Ta—O, and Bi—O. Also, a nitride such as SiN and AlN, and a carbide such as SiC may be contained.

The composition ratio of In or Al exceeds 30 atm %, and preferably 50 atm % or more to the composition ratio of other elements excluding O, N and C, i.e., of Zn, Sn, Ga, Si, Ti, V, Cr, Nb, Zr, Hf, Ta, Bi and the like. When both of In and Al are contained, the sum of the composition ratios may exceed 30 atm %, and be preferably 50 atm % or more. When the oxide layers having such composition are disposed adjacent to the specific recording layers, the durability of the specific recording layers can be enhanced. Also, as the multilayered configuration, good recording properties can be provided.

The In/Al oxide layers having such a configuration may be disposed adjacent to the top and/or bottom of the specific recording layer. When they are formed on the top, i.e., at the light incident side, the reflectance and the transmittance can be accurately controlled by adjusting the thickness thereof. When they are formed on the bottom, i.e., at the opposite side of the light incident side, a recording power margin can be widen. Consequently, by disposing them adjacent to the top or bottom, preferably adjacent to the top and bottom, the specific recording layer in the multilayer recording layer configuration can hold good recording properties. In addition, similar to the case that the dielectric layers made of other materials are disposed adjacently, the durability can also be advantageously enhanced.

The dielectric layers 131a and 131b (231a, 231b . . . or the like) that are the In/Al oxide layers may have a thickness of several nm to tens nm, preferably 3 nm to 50 nm. If the thickness is less than 3 nm, it is difficult to keep film thickness accuracy, and to provide preferable ranges of transmittance and reflectance when there are two to four layers. On the other hand, if the thickness exceeds 50 nm, other advantages cannot be provided any more, and a film forming time lengthens, which affects the productivity. Thus, the film thickness is preferably 3 nm to 50 nm.

Especially when the dielectric layers including the oxide layers disposed adjacent to the top or bottom of the specific recording layer are made of an In—Sn—O layer (ITO layer), an In—Si—Zr—O layer or the like, storage reliability can be enhanced.

When the dielectric layers including the In/Al oxide layers are not disposed, the dielectric layers including other materials having a function as a protective layer may be disposed adjacent to the specific recording layer at which no dielectric layer is disposed. In this case, the light permeable dielectric material having several nm to tens nm may be used. Examples of the applicable materials include oxides such as In—O, Zn—O, Al—O, Sn—O, Ga—O, Si—O, Ti—O, V—O, Cr—O, Nb—O, Zr—O, Hf—O, Ta—O, and Bi—O. Also, a nitride such as SiN and AlN and a carbide such as SiC can be used. When these materials are used, the durability of the recording layer can be enhanced.

The intermediate layer 14 (241, 242, 341 to 343) including the light permeable material is formed between respective recording layers, e.g., between the recording layer 121 and the recording layer 122 shown in FIG. 1. As the material of the intermediate layer 14 (such as 241), any material that has sufficient light permeability not affecting the recording properties, and has a thickness that inhibits a cross talk between the layers within a predetermined value, may be used. An example of the applicable material includes ultraviolet curable resin or the like.

[Manufacturing Method]

The respective recording layers 121 (122, 221, . . . and the like) including the specific recording layers can be formed by vapor deposition, sputtering or the like. For example, when the specific recording layers are formed by sputtering, a Pd target and one or more targets including $In_2O_3$, ZnO, $Al_2O_3$ and SnO are used. Alternatively, an alloy target having the intended composition ratio may be used. The films are formed by sputtering while flowing Ar gas or $N_2$ gas together with $O_2$ gas.

At this time, by forming the specific recording layers especially using $N_2$ gas, a bond status between Pd and oxygen can be controlled. It is thus possible to control the transmittance and the reflectance of the specific recording layer within the desired ranges. In particular, it is possible that the specific recording layer has high transmittance and low reflectance.

As described above, the specific recording layer includes PdO and $PdO_2$. When the recording layer including PdO and $PdO_2$ is formed by sputtering using only $O_2$ gas and Ar gas, the transmittance of the recording layer can be increased by controlling the bond status of the Pd and oxygen in the recording layer.

In contrast, when the film is formed by sputtering using nitrogen gas together with oxygen gas, the transmittance of the recording layer can be further increased by controlling the bond status of Pd and oxygen in the recording layer. When the nitrogen gas flows together with the oxygen gas, there is a trend that Pd atoms bonded to one oxygen atom (PdO) increase in number than Pd atoms bonded to two oxygen atoms ($PdO_2$).

Accordingly, when the specific recording layer is formed especially on the light incident side, the film is preferably formed by sputtering using $N_2$ gas together with $O_2$ gas. It should be noted that the flow rates of the oxygen gas and the nitrogen gas can be arbitrary. Preferably, the flow rate of the oxygen gas is within the range of 10 sccm to 100 sccm, and the flow rate of the nitrogen gas is within the range of 2 sccm to 50 sccm.

When the respective dielectric layers 131a, 131b, . . . 334a, 334b are formed, the films can be similarly formed by sputtering using targets of the materials for the respective dielectric layers.

As the material of the intermediate layer 14 (such as 241), light curable resin such as ultraviolet curable resin, thermosetting resin or the like can be used. In this case, it is formed by applying the resin by a spin coating method or the like, and then heating or irradiating with light.

A protective layer 13 (23, 33) disposed on the light incident side for recording can be formed of a thermosetting or light curable resin material. The film is formed by applying the material by the spin coating method or the like, and then being cured by heating, light irradiation, e.g., with ultraviolet rays. Alternatively, the protective layer 13 can be formed using a resin sheet made of the ultraviolet curable resin and the like and polycarbonate, or a resin sheet made of a bonding layer and polycarbonate and the like.

It should be noted that, although not shown, a hard coat for protecting recording and reproducing quality of information signals from, for example, a mechanical impact, flaws, dusts caused by user's handling, attached fingerprints or the like, may be disposed on the surface (laser irradiated surface) of the protective layer 13 (23, 33). The hard coat may include silica gel fine powder for enhancing the mechanical strength, and solvent-based or solventless ultraviolet curable resin. In order to have the mechanical strength, water repellency and oil repellency, the thickness is preferably 1 µm to about several µm.

According to the optical recording medium 10 (20, 30) having such a configuration, excellent recording and reproducing properties can be provided as shown in experiments as described later. For example, the high capacity optical disc can be provided with sufficient properties in terms of reflectance of regeneration signals, transmittance, record sensitivity, recording margin and the like.

<2. Reference Embodiment (Recoding Properties of Optical Recording Medium Having Monolayer Configuration Including Only One Specific Recording Layer)>

Before reviewing the recording properties of the multilayered optical recording medium having the specific recording layers, the recording properties of the optical recording medium having the monolayer configuration including only one specific recording layer was reviewed as a reference embodiment.

In a first reference embodiment, a substrate of the optical recording medium was formed of polycarbonate in a disc shape with an outside diameter of 120 mm and a thickness of 1.1 mm. On the substrate, an In—Zn—O bottom dielectric layer having a thickness of 15 nm, an In—Zn—Sn—Al—Pd—O specific recording layer having a thickness of 40 nm, and an In—Zn—O top dielectric layer having a thickness of 15 nm were formed. Further, a protective layer having a thickness of 100 μm including ultraviolet curable resin was formed as a so-called cover layer of an outermost surface at the light incident side for recording.

The respective layers were formed using respective targets. $In_2O_3$ and ZnO targets were used for forming the bottom and top dielectric layers, and $In_2O_3$, ZnO, SnO, $Al_2O_3$ and Pd targets were used for forming the specific recording layers. By controlling sputtering electrical power of the respective targets, the compositions of the respective layers were adjusted. The composition ratio in the top and bottom dielectric layers was In:Zn=8:2. In other words, they were composed of an oxide including In as a main component. The composition ratio in the specific recording layers was In:Zn:Sn:Al:Pd=48:16:4:12:20.

The flow rates of the gases were Ar:70 sccm and $O_2$:30 sccm upon the sputter film formation of the dielectric layer and Ar:70 sccm, $O_2$:30 sccm and $N_2$:10 sccm upon the sputter film formation of the recording layers.

Figure 4:
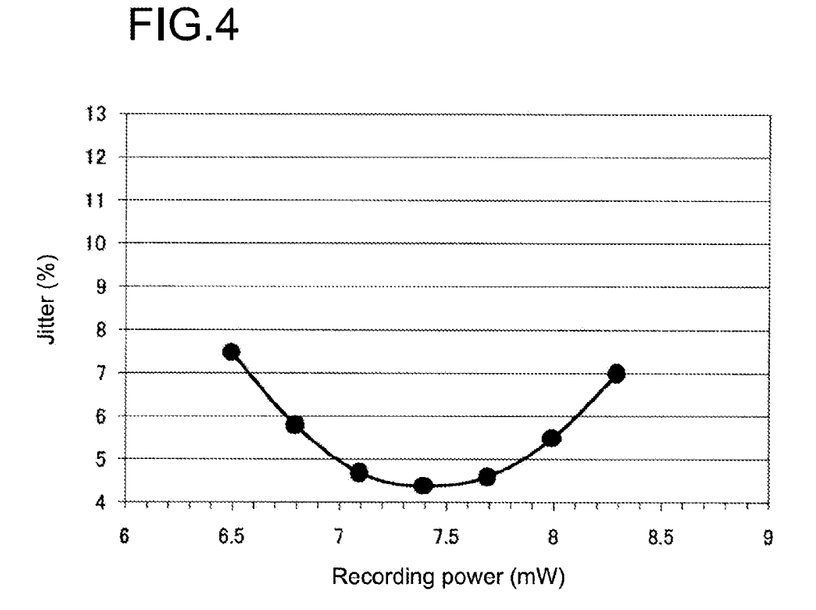
[FIG. 4] A graph showing recording properties in a first reference embodiment of the optical recording medium according to the present invention having the specific recording layers in a monolayer configuration.

Five tracks were recorded consecutively in a 1× speed (clock of 66 MHz, line speed of 4.92 m/s) in the thus-produced optical recording medium using an apparatus for evaluating Blu-ray Disc™ to measure jitter in a central track. In the evaluation apparatus, there is a recording mode that realizes a recording capacity of about 25 GB per one layer with a light wavelength for recording of 405 nm and a numerical aperture NA of 0.85 of a collecting lens. As a result, a jitter bottom value was favorably 4.4%. FIG. 4 shows the recording properties of the jitter of the optical recording medium.

It should be noted that, in the recording layer of the optical recording medium, the reflectance can be controlled by the composition and the film thickness thereof and the film thickness of the dielectric layer disposed adjacent to top and bottom.

Also, the transmittance can be controlled mainly by the composition of the recording layer. For example, when an additive amount of Al is increased, the transmittance can be gradually increased. Conversely, when an additive amount of Zn is increased, the transmittance may be gradually decreased. In contrast, when an additive amount of Pd is increased, the transmittance is significantly decreased. When an additive amount of Pd is decreased, the transmittance is significantly increased.

The recording layer of the optical recording medium in the above-mentioned first reference embodiment has the reflectance of 6.0% and the transmittance of 65%. The recording layer is favorably used as, for example, the second recording layer 122 (L1) at light incident side for recording in the optical recording medium having the two-layered configuration, as the second or third recording layer 222 or 223 (L1 or L2) in the optical recording medium having the three-layered configuration, or as the second recording layer 322 (L1) in the optical recording medium having the four-layered configuration.

Otherwise, by changing the composition or the thickness, the recording layer in the first reference embodiment can be used as other recording layer.

In a second reference embodiment, a substrate of the optical recording medium was formed of polycarbonate in a disc shape with an outside diameter of 120 mm and a thickness of 1.1 mm as in the first reference embodiment. On the substrate, an In—Sn—O bottom dielectric layer having a thickness of 8 nm, a Zn—W—Pd—O specific recording layer having a thickness of 30 nm, and an In—Sn—O top dielectric layer having a thickness of 15 nm were formed. Further, a protective layer having a thickness of 100 μm including ultraviolet curable resin was formed as a so-called cover layer of an outermost surface at the light incident side for recording.

The respective layers were formed using respective targets. $In_2O_3$ and SnO targets were used for forming the bottom and top dielectric layers, and ZnO, W and Pd targets were used for forming the specific recording layers. By controlling sputtering electrical power of the respective targets, the compositions of the respective layers were adjusted. The composition ratio in the top and bottom dielectric layers was In:Sn=9:1. In other words, they were composed of an oxide including In as a main component. The composition ratio in the specific recording layers was Zn:W:Pd=60:25:15.

The flow rates of the gases were Ar:50 sccm and $O_2$:5 sccm upon the sputter film formation of the dielectric layer and Ar:30 sccm and $O_2$:30 sccm upon the sputter film formation of the specific recording layer.

Thus, an optical recording medium in the second reference embodiment was produced.

A comparative optical recording medium was produced similarly to the second reference embodiment except that only one specific recording layer was formed without disposing the top and bottom In—Sn—O dielectric layers.

Five tracks were recorded consecutively in a 2× speed (clock of 132 MHz, line speed of 7.68 m/s) in the thus-produced respective optical recording medium using the evaluation apparatus similar to that used in the first reference embodiment to measure i-MLSE in a central track.

Figure 5:
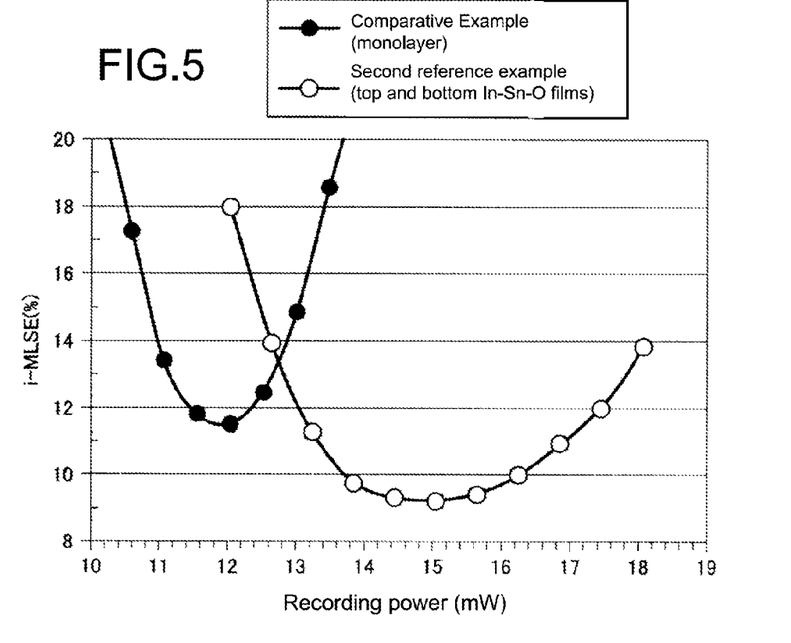
[FIG. 5] A graph showing recording layer properties in a second reference embodiment of the optical recording medium according to the present invention having the specific recording layers in a monolayer configuration, as compared with recording layer properties of a comparative embodiment.

FIG. 5 shows the recording properties of i-MLSE (Maximum likelihood Sequence Estimation, for evaluation index of new generation optical discs) of the optical recording media in the second reference embodiment and in a comparative embodiment. In FIG. 5, white circles represent the result of the second reference embodiment, and black circles represent the result of the comparative embodiment.

As shown in FIG. 5, in the second reference embodiment in which the In—Sn—O films are disposed on top and bottom of the specific recording layers, significantly enhanced i-MLSE value and power margin as compared with the comparative specific recording monolayer are obtained.

Accordingly, the ZnWPdO specific recording layer can provide excellent properties, i.e., excellent i-MLSE value and the recording power margin by disposing the dielectric layers including In.

In a third reference embodiment, an optical recording medium was produced similarly to the second reference embodiment except that the Zn—W—Pd—O specific recording layer has a thickness of 40 nm, the composition ratio was Zn:W:Pd=70:20:10, and the In—Sn—O bottom dielectric layer has a thickness of 10 nm.

The flow rates of the gases were Ar:50 sccm and $O_2$:5 sccm upon the sputter film formation of the dielectric layer and Ar:30 sccm and $O_2$:30 sccm upon the sputter film formation of the specific recording layers.

Figure 6:
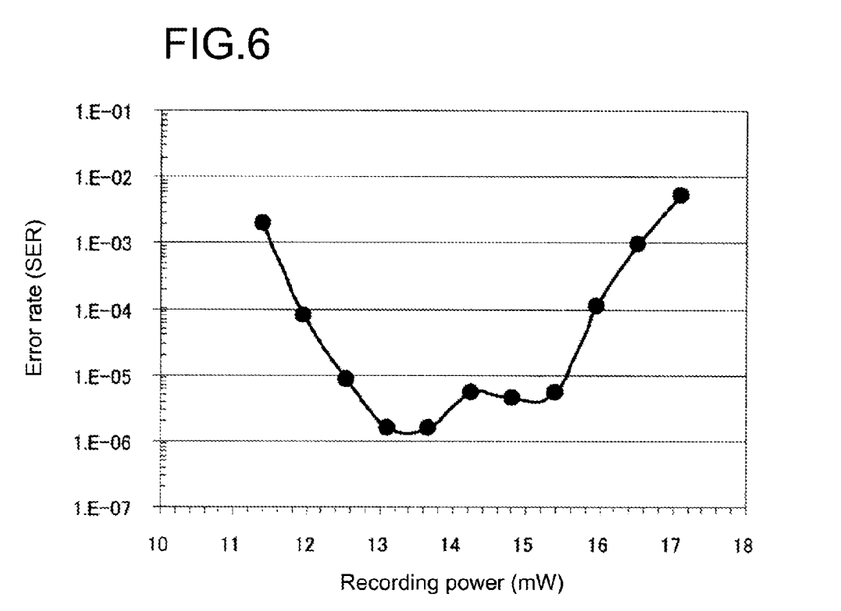
[FIG. 6] A graph showing recording layer properties in a third reference embodiment of the optical recording medium according to the present invention having the specific recording layers in a monolayer configuration.

The specific recording layer of the optical recording medium in the third reference embodiment was examined for the error rate using the evaluation apparatus similar to that used in the first reference embodiment. FIG. 6 shows the results of the error rate.

As shown in FIG. 6, the results were that the error rate was sufficiently low, and the power margin was excellent.

Good results were provided in the optical recording media in the second reference embodiment and the third reference embodiment, although the specific recording layer includes ZnWPdO and no In.

Accordingly, it reveals that excellent recording properties can be provided by disposing the In—Sn—O dielectric layer adjacent to the specific recording layer, even if the specific recording layer includes no In.

The recording layers in the optical recording media in the second reference embodiment and the third reference embodiment are favorably used as, for example, the second recording layer 122 (L1) at light incident side for recording in the optical recording medium having the two-layered configuration, as the second or third recording layer 222 or 223 (L1 or L2) in the optical recording medium having the three-layered configuration, or as the second recording layer 322 (L1) in the optical recording medium having the four-layered configuration. Furthermore, by changing the composition or the thickness, the recording layers can be used as other recording layers.

<3. Embodiments (Recording Properties of Embodiments of Configurations having Two-, Three- and Four-layered Recording Layers)>

Then, the optical recording media having two to four layers including the above-described specific recording layers were produced and examined for the recording properties. In each embodiment, a substrate of the optical recording medium was formed of polycarbonate in a disc shape with an outside diameter of 120 mm and a thickness of 1.1 mm. The intermediate layer is formed of acrylic ultraviolet curable resin. As a so-called cover layer, a protective layer of an outermost surface at the light incident side for recording was formed of acrylic ultraviolet curable resin. A total thickness from the first recording layer to the protective layer was configured to be 100 μm so that an overall thickness was 1.2 mm. The intermediate layer and the protective layer were formed by the spin coating method, which were then irradiated with ultraviolet rays and were cured. Hereinafter, respective embodiments will be described in detail.

(1) Embodiment 1 (Two-Layered Configuration, see FIG. 1)

On the substrate 11 having the above-described configuration, the first recording layer 121 (L0), the intermediate layer 14, the second recording layer 122 (L1) and the protective layer 15 as stated below were formed. Adjacent to the top and bottom of the respective recording layers 121 and 122, the bottom dielectric layers 131a and 132a and the top dielectric layers 131b and 132b, which included an oxide containing In as a main component in this case, were formed as the In/Al oxide. The materials and the thicknesses of the plurality of layers are as follows:

(The first recording layer L0): bottom dielectric layer In—Zn—Sn—O (thickness of 5 nm)/recording layer In—Zn—Sn—Pd—O (thickness of 40 nm)/top dielectric layer In—Zn—Sn—O (thickness of 5 nm)

(The second recording layer L1): bottom dielectric layer In—Zn—Sn—O (thickness of 10 nm)/recording layer In—Zn—Sn—Pd—O (thickness of 40 nm)/top dielectric layer In—Zn—Sn—O (thickness of 15 nm)

Respective layers were formed using respective targets. The flow rates of the gases were Ar:70 sccm and $O_2$:30 sccm upon the film formation of the respective dielectric layers, Ar:70 sccm and $O_2$:30 sccm upon the film formation of the recording layer L0, and Ar:70 sccm, $O_2$:30 sccm and $N_2$:10 sccm upon the film formation of the recording layer L1.

The compositions of the plurality of layers represented by a ratio in atomic % are as follows:
(L0 top and bottom dielectric layers) In:Zn:Sn=70:20:10
(L0 recording layer) In:Zn:Sn:Pd=25:35:5:35
(L1 top and bottom dielectric layers) In:Zn:Sn=70:20:10
(L1 recording layer) In:Zn:Sn:Pd=35:35:10:20

It should be noted that the first recording layer 121 (L0) has the reflectance of 7.7%, and the second recording layer 122 (L1) has the reflectance of 7.5% and the transmittance of 56%.

Figure 7:
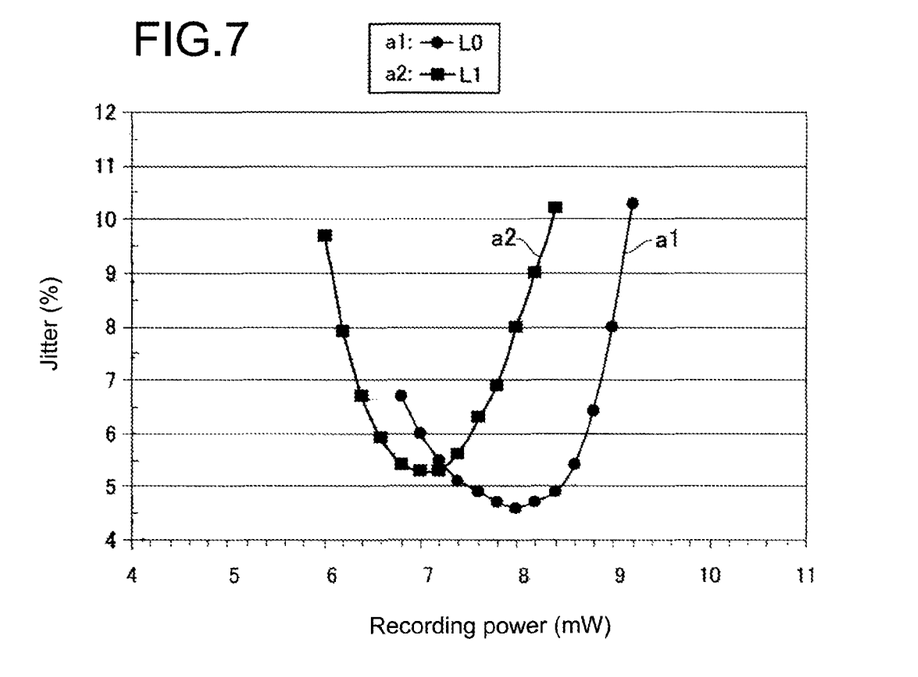
[FIG. 7] A graph showing properties in the plurality of recording layers of the optical recording medium according to an embodiment of the present invention.

Five tracks were recorded consecutively in a 1× speed (clock of 66 MHz, line speed of 4.92 m/s) in the optical recording medium of Embodiment 1 using the evaluation apparatus similar to that used in the above-described reference embodiments to measure jitter in a central track. In this case, the recording mode realizes the recording capacity of about 25 GB per one layer. As a result, the jitter bottom values were favorably 4.6% in the first recording layer 121 (L0) and 5.2% in the second recording layer 122 (L1). FIG. 7 shows the recording properties of the jitter of the optical recording medium. In FIG. 7, the solid lines a1 and a2 represent the results of the first recording layer 121 and the second recording layer 122, respectively.

In this case, the first and second recording layers 121 and 122 are the specific recording layers, and the dielectric layers 131a, 131b, 132a and 132b including the In/Al oxide layers are formed at the top and bottom of the specific recording layers. Although the dielectric layers 131a and 131b are formed of the same material as the dielectric layers 132a and 132b, respectively, it is possible to use different materials and the composition ratios in the top and bottom layers, even so, excellent recording properties can be provided.

(2) Embodiment 2 (Three-Layered Configuration, see FIG. 2)

On the substrate 21 having the above-described configuration, the first recording layer 221 (L0), the intermediate layer 241, the second recording layer 222 (L1), the intermediate layer 242, the third recording layer 223 (L2) and the protective layer 25 as stated below were formed. In this embodiment, respective recording layers 221 to 223 were all the specific recording layers, and the dielectric layers 231a, 231b, . . . 233a, 233b at top and bottom thereof were configured by the In/Al oxide, in this case, the oxide including In as a main component. The materials and the thicknesses of the plurality of layers are as follows:

(The first recording layer L0): bottom dielectric layer In—Sn—O (thickness of 10 nm)/recording layer In—Zn—Sn—Al—Pd—O (thickness of 40 nm)/top dielectric layer In—Sn—O (thickness of 15 nm)

(The second recording layer L1): bottom dielectric layer In—Zn—Ga—O (thickness of 10 nm)/recording layer In—Zn—Sn—Al—Pd—O (thickness of 40 nm)/top dielectric layer In—Zn—Ga—O (thickness of 25 nm)

(The third recording layer L2): bottom dielectric layer In—Si—Zr—O (thickness of 10 nm)/recording layer In—Zn—Sn—Al—Pd—O (thickness of 40 nm)/top dielectric layer In—Si—Zr—O (thickness of 30 nm)

Respective layers were formed using respective targets. The flow rates of the gases were Ar:70 sccm and $O_2$:30 sccm upon the film formation of the respective dielectric layers, Ar:70 sccm and $O_2$:30 sccm upon the film formation of the recording layer L0, Ar:70 sccm, $O_2$:30 sccm and $N_2$:10 sccm upon the film formation of the recording layers L1 and L2.

The compositions of the plurality of layers represented by a ratio in atomic % are as follows:
(L0 top and bottom dielectric layers) In:Sn=90:10
(L0 recording layer) In:Zn:Sn:Al:Pd=48:16:4:12:20
(L1 top and bottom dielectric layers) In:Zn:Ga=86:7:7
(L1 recording layer) In:Zn:Sn:Al:Pd=55:15:5:13:12
(L2 top and bottom dielectric layers) In:Si:Zr=50:20:30
(L2 recording layer) In:Zn:Sn:Al:Pd=55:15:5:15:10

It should be noted that the first recording layer 221 (L0) has the reflectance of 3.1%, and the second recording layer 222 (L1) has the reflectance of 2.7% and the transmittance of 75%. The third recording layer 223 (L2) has the reflectance of 3.0% and the transmittance of 80%.

Figure 8:
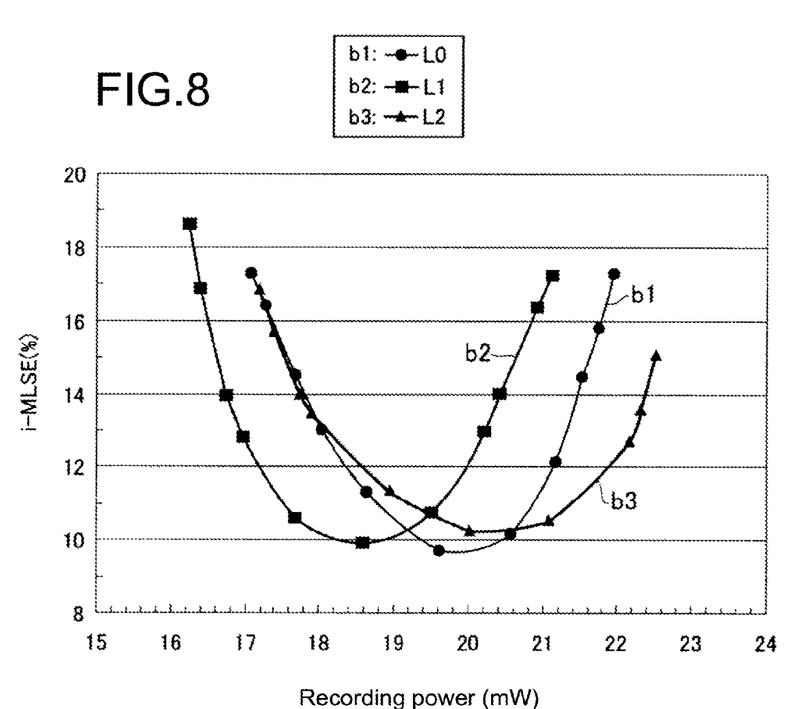
[FIG. 8] A graph showing properties in recording layers of the optical recording medium according to another embodiment of the present invention.

Five tracks were recorded consecutively in a 2× speed (clock of 132 MHz, line speed of 7.36 m/s) in the optical recording medium of Embodiment 2 using the evaluation apparatus similar to that used in the above-described reference embodiments and Embodiment 1 to measure i-MLSE (Maximum likelihood Sequence Estimation, for evaluation index of new generation optical discs) in a central track. In this case, the recording mode realizes the recording capacity of about 33.4 GB per one layer. As a result, the i-MLSE values were favorably 9.7% in the first recording layer 221 (L0), 10.0% in the second recording layer 222 (L1), and 10.2% in the third recording layer 223 (L2). FIG. 8 shows the recording properties of the i-MLSE of the optical recording medium. In FIG. 8, the solid lines b1 to b3 represent the results of the first recording layer 221, the second recording layer 222 and the third recording layer 223, respectively.

In this case, the first to third recording layers 221 to 223 are the specific recording layers, and the dielectric layers 231a, 231b, ..., 233a, 233b including the In/Al oxide layers are formed at the top and bottom of the specific recording layers. Although the dielectric layers 231a and 231b, ..., 233a and 233b, which sandwiches the specific recording layers therebetween, are formed of the same material, it is possible to use different materials and the composition ratios in the top and bottom layers, even so, excellent recording properties can be provided.

(3) Embodiment 3 (Four-Layered Configuration, see FIG. 3)

On the substrate 31 having the above-described configuration, the first recording layer 321 (L0), the intermediate layer 341, the second recording layer 322 (L1), the intermediate layer 342, the third recording layer 322 (L2) as stated below were formed. Further, the intermediate layer 343, the fourth recording layer 324 (L3) and the protective layer 35 were formed thereon. In this embodiment, respective recording layers 321 to 324 were all the specific recording layers. The dielectric layers 331a, 331b, ... 334a, 334b at top and bottom thereof were configured by the In/Al oxide, in this case, the oxide including In as a main component. The materials and the thicknesses of the plurality of layers are as follows:

(The first recording layer L0): bottom dielectric layer In—Zn—Sn—O (thickness of 5 nm)/recording layer In—Zn—Sn—Pd—O film (thickness of 40 nm)/top dielectric layer In—Zn—Sn—O (thickness of 5 nm)
(The second recording layer L1): bottom dielectric layer In—Zn—O (thickness of 10 nm)/recording layer In—Zn—Sn—Al—Pd—O film (thickness of 40 nm)/top dielectric layer In—Zn—O (thickness of 15 nm)
(The third recording layer L2): bottom dielectric layer In—Zn—Ga—O (thickness of 10 nm)/recording layer In—Zn—Sn—Al—Pd—O film (thickness of 40 nm)/top dielectric layer In—Zn—Ga—O (thickness of 25 nm)
(The fourth recording layer L3): bottom dielectric layer In—Zn—Al—O (thickness of 10 nm)/recording layer In—Zn—Sn—Al—Pd—O film (thickness of 40 nm)/top dielectric layer In—Zn—Al—O (thickness of 30 nm)

Respective layers were formed using respective targets. The flow rates of the gases were Ar:70 sccm and $O_2$:30 sccm upon the film formation of the respective dielectric layers, Ar:70 sccm and $O_2$:30 sccm upon the film formation of the recording layer L0, and Ar:70 sccm, $O_2$:30 sccm and $N_2$:10 sccm upon the film formation of the recording layers L1 to L3.

The compositions of the plurality of layers represented by a ratio in atomic % are as follows:
(L0 top and bottom dielectric layers) In:Zn:Sn=70:20:10
(L0 recording layer) In:Zn:Sn:Pd=25:35:5:35
(L1 top and bottom dielectric layers) In:Zn=80:20
(L1 recording layer) In:Zn:Sn:Al:Pd=48:16:4:12:20
(L2 top and bottom dielectric layers) In:Zn:Ga=86:7:7
(L2 recording layer) In:Zn:Sn:Al:Pd=55:15:5:13:12
(L3 top and bottom dielectric layers) In:Zn:Al=50:10:40
(L3 recording layer) In:Zn:Sn:Al:Pd=55:15:5:15:10

It should be noted that the first recording layer 321 (L0) has the reflectance of 2.5%, and the second recording layer 322 (L1) has the reflectance of 3.3% and the transmittance of 65%. The third recording layer 323 (L2) has the reflectance of 3.2% and the transmittance of 75%, and the fourth recording layer 324 (L3) has the reflectance of 3.6% and the transmittance of 80%.

Figure 9:
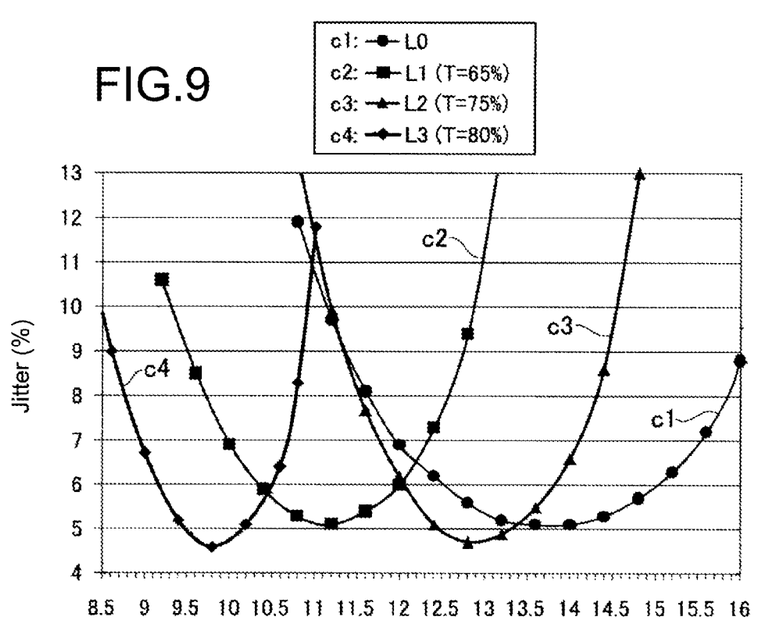
[FIG. 9] A graph showing properties in recording layers of the optical recording medium according to another embodiment of the present invention.

Five tracks were recorded consecutively in a 1× speed (clock of 66 MHz, line speed of 4.92 m/s) in the optical recording medium of Embodiment 3 using the evaluation apparatus similar to that used in the above-described reference embodiments and Embodiments 1 and 2 to measure jitter in a central track. In this case, the recording mode realizes the recording capacity of about 25 GB per one layer. As a result, the jitter bottom values were favorably 5.1% in the first recording layer 321 (L0), 5.1% in the second recording layer 322 (L1), 4.7% in the third recording layer 323 (L2), and 4.7% in the fourth recording layer 324 (L3). FIG. 9 shows the recording properties of the jitter of the optical recording medium. In FIG. 9, the solid lines c1 to c4 represent the results of the first recording layer 321 to the fourth recording layer 324, respectively.

Figure 10:
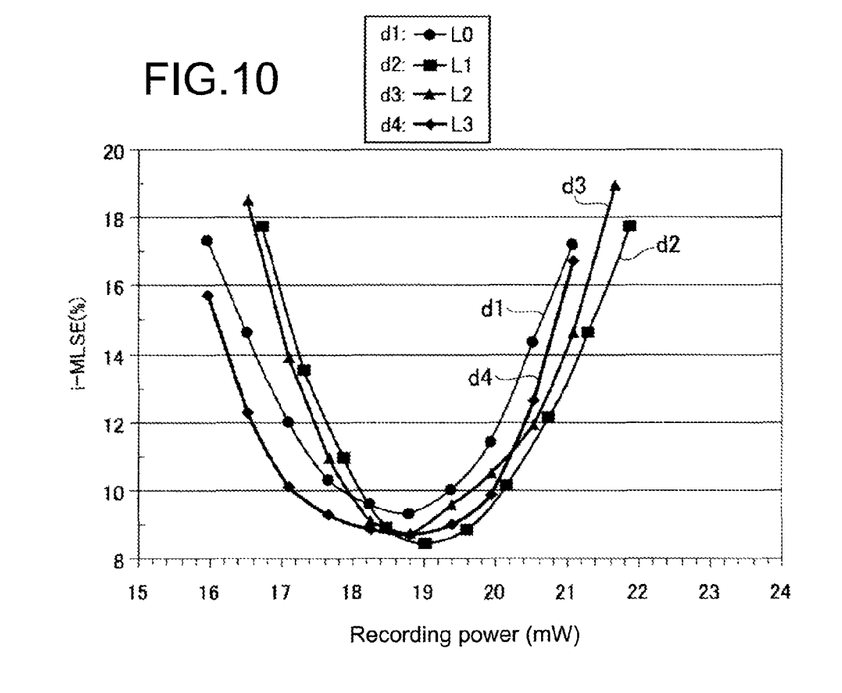
[FIG. 10] A graph showing properties in the plurality of recording layers of the optical recording medium according to another embodiment of the present invention.
Figure 11:
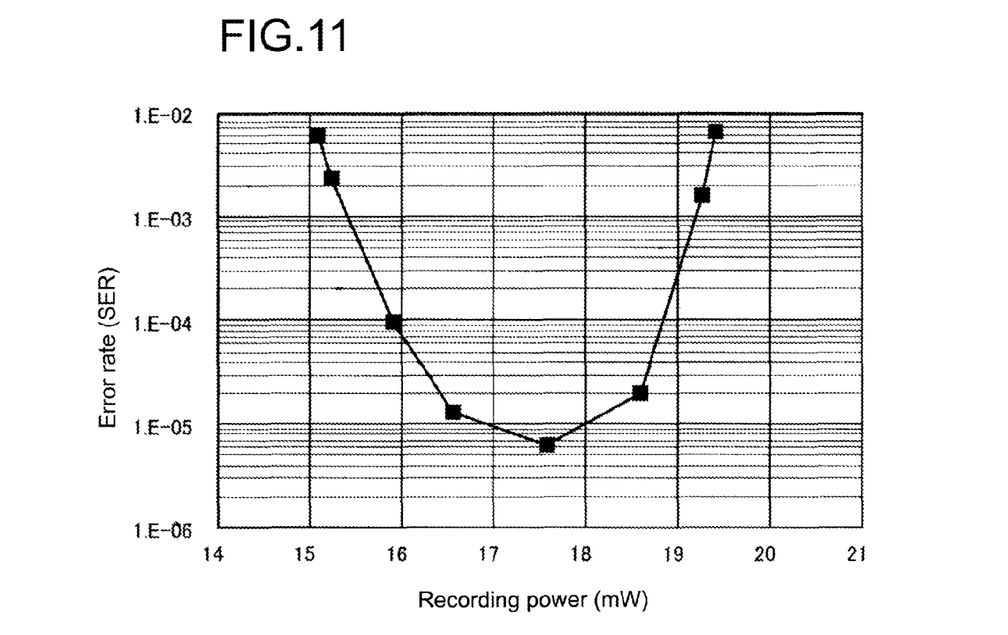
[FIG. 11] A graph showing properties in the recording layer (L3) of the optical recording medium according to another embodiment of the present invention.
Figure 12:
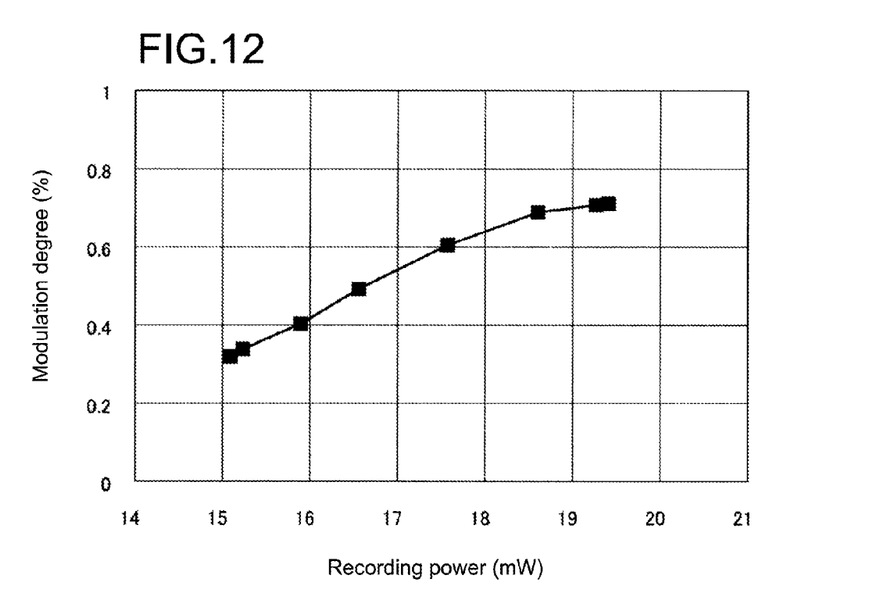
[FIG. 12] A graph showing properties in the recording layer (L3) of the optical recording medium according to another embodiment of the present invention.

Five tracks were recorded consecutively in a 2× speed (clock of 132 MHz, line speed of 7.68 m/s) using the similar evaluation apparatus to measure i-MLSE in a central track. In this case, the recording mode realizes the recording capacity of about 32 GB per one layer. As a result, the i-MLSE values were favorably 9.3% in the first recording layer 321 (L0), 8.4% in the second recording layer 322 (L1), 8.8% in the third recording layer 323 (L2), and 8.8% in the fourth recording layer 324 (L3). FIG. 10 shows the recording properties of the i-MLSE of the optical recording medium. In FIG. 10, the solid lines d1 and d4 represent the results of the first recording layer 321 to the fourth recording layer 324, respectively. FIGS. 11 and 12 show the error rate and the modulation degree of the fourth recording layer 324 (L3).

Also in this case, the first to fourth recording layers 321 to 324 are the specific recording layers, and the dielectric layers 331a, 331b, ..., 334a, 334b including the In/Al oxide layers are formed at the top and bottom of the specific recording layers. Although the dielectric layers 331a and 331b, ..., 334a and 334b, which sandwiches the specific recording layers therebetween, are formed of the same material, it is possible to use different materials and the composition ratios in the top and bottom layers. Including these embodiments, the recording mode having the recording capacity of about 25 GB or about 32 GB per one layer can provide excellent recording properties.

(4) Embodiment 4 (Four-Layered Configuration, Alternative Embodiment of Embodiment 3)

An optical recording medium was produced as in Embodiment 3 except that only the first recording layer 321 was not the specific recording layer, and was formed of other material, and the recording properties were measured. The materials and the thicknesses of the first recording layer 321 in this case are as follows:

Also, between the substrate 31 and the first recording layer 321, an Ag reflective layer having a thickness of 100 nm was formed.

(The first recording layer L0): bottom dielectric layer InSnO (thickness of 10 nm)/recording layer ZnS—SiO$_2$ (thickness of 10 nm)/recording layer Sb—ZnS—SiO$_2$ (thickness of 20 nm)/top dielectric layer InSnO (thickness of 20 nm)

The composition ratios in the respective layers of the recording layers were as follows:
(In—Sn—O layer) In:Sn=90:10
(ZnS—SiO$_2$ layer) ZnS:SiO$_2$=80:20
(Sb—ZnS—SiO$_2$ layer) Sb:ZnS—SiO$_2$=4:6
(In respect to ZnS—SiO$_2$, ZnS:SiO$_2$=80:20)

Also in such a configuration having the first recording layer 321 (L0), five tracks were recorded consecutively in a 2× speed (clock of 132 MHz, line speed of 7.68 m/s) using the evaluation apparatus similar to that used in the above-described embodiments to measure i-MLSE in a central track. In this case, the recording mode realizes the recording capacity of about 32 GB per one layer. As a result, the i-MLSE value was 9.8%.

In each Embodiment 1 to 4 as described above, values of the jitter and the i-MLSE were very small and the recording power margin was sufficiently provided and thus excellent recording properties can be provided.

In particular, it is found that excellent recording properties can be provided in Embodiment 2 having a three-layered configuration with the recording capacity of 33.4 GB per one layer and in Embodiments 3 and 4 each having a four-layered configuration with the recording capacity of 32 GB per one layer.

(5) Embodiment 5 (Four-Layered Configuration)

On the substrate 31 having the above-described configuration, the first recording layer 321 (L0), the intermediate layer 341, the second recording layer 322 (L1), the intermediate layer 342, and the third recording layer 322 (L2) as stated below were formed. Further, the intermediate layer 343, the fourth recording layer 324 (L3) and the protective layer 35 were formed thereon. In this embodiment, respective recording layers 321 to 324 were all the specific recording layers. The dielectric layers 331a, 331b, ... 334a, 334b at top and bottom thereof were configured by the In/Al oxide, in this case, the oxide including In as a main component. The materials and the thicknesses of the plurality of layers are as follows:

(The first recording layer L0): bottom dielectric layer In—Sn—O (thickness of 10 nm)/recording layer Zn—Pd—O film (thickness of 30 nm)/top dielectric layer In—Sn—O (thickness of 5 nm)
(The second recording layer L1): bottom dielectric layer In—Sn—O (thickness of 10 nm)/recording layer Zn—W—Pd—O film (thickness of 30 nm)/top dielectric layer In—Sn—O (thickness of 15 nm)
(The third recording layer L2): bottom dielectric layer In—Sn—O (thickness of 10 nm)/recording layer Zn—W—Pd—O film (thickness of 30 nm)/top dielectric layer In—Sn—O (thickness of 22 nm)
(The fourth recording layer L3): bottom dielectric layer In—Si—Zr—O (thickness of 10 nm)/recording layer Zn—W—Pd—O film (thickness of 30 nm)/top dielectric layer In—Si—Zr—O (thickness of 30 nm)

Respective layers were formed using respective targets. When the dielectric layers were formed, In$_2$O$_3$, SnO, SiO$_2$ and ZrO$_2$ targets were used. When the specific recording layers were formed, ZnO, W and Pd targets were used. The flow rates of the gases were Ar:50 sccm and O$_2$:5 sccm upon the film formation of the In—Sn—O dielectric layer, Ar:50 sccm and O$_2$:1 sccm upon the film formation of the In—Si—Zr—O dielectric layer, and Ar:30 sccm and O$_2$:30 sccm upon the film formation of respective recording layers.

The compositions of the plurality of layers represented by a ratio in atomic % are as follows:
(L0 top and bottom dielectric layers) In:Sn=9:1
(L0 recording layer) Zn:Pd=60:40
(L1 top and bottom dielectric layers) In:Sn=9:1
(L1 recording layer) Zn:W:Pd=60:20:20
(L2 top and bottom dielectric layers) In:Sn=9:1
(L2 recording layer) Zn:W:Pd=60:30:10
(L3 top and bottom dielectric layers) In:Si:Zr=50:25:25
(L3 recording layer) Zn:W:Pd=60:30:10

Figure 13:
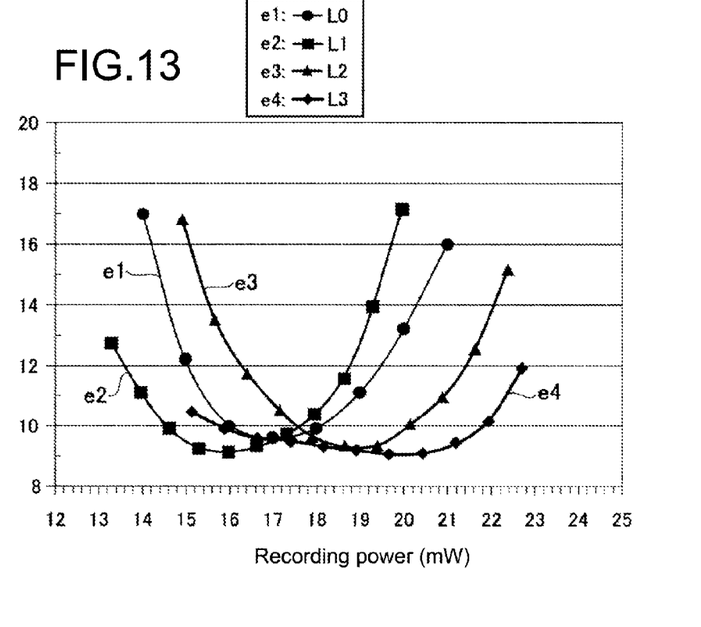
[FIG. 13] A graph showing properties in the plurality of recording layers of the optical recording medium according to still another embodiment of the present invention.

Five tracks were recorded consecutively in a 2× speed (clock of 132 MHz, line speed of 7.68 m/s) in the optical recording medium of Embodiment 5 using the evaluation apparatus similar to that used in the above-described reference embodiments and Embodiments 1 to 4 to measure i-MLSE in a central track. In this case, the recording mode realizes the recording capacity of about 32 GB per one layer. As a result, the i-MLSE values were favorably 9.5% in the first recording layer 321 (L0), 9.1% in the second recording layer 322 (L1), 9.3% in the third recording layer 323 (L2), and 9.0% in the fourth recording layer 324 (L3). FIG. 13 shows the recording properties of the i-MLSE of the optical recording medium. In FIG. 13, the solid lines e1 to e4 represent the results of the first recording layer 321 to the fourth recording layer 324, respectively.

In Embodiment 5, the InSnO layer (ITO layer) and the InSnZrO layer were used in the dielectric layers adjacent to the specific recording layers. These InSnO layer (ITO layer) and the InSnZrO layer can also be used as the dielectric layers adjacent to the specific recording layers as to the materials of the specific recording layers in Embodiments 1 to 4 and the materials of other specific recording layers.

It should be noted that the optical recording medium of the present invention is not limited to the configuration in each Embodiment described above. When only one specific recording layer is disposed, excellent recording properties can be provided as well. Also, the In/Al oxide layers disposed adjacent to the specific recording layers are not limited to the configuration in each Embodiment described above, and can be disposed only at top or bottom layer, or have different materials at top and bottom.

In addition, when a plurality of the specific recording layers are disposed and the In/Al oxide layers are disposed adjacent to the top and bottom or to one side, the In/Al oxide layers disposed adjacent to the respective specific recording layers have different compositions in each Embodiment described above. On the other hand, the In/Al oxide layers disposed adjacent to the respective specific recording layers may all have the same composition, and only the film thickness may be changed.

It is to be understood that the present invention is not limited to the embodiments as described above. Various modifications and alternations can be made without departing from the scope of the present invention.

Reference Numerals 10, 20, 30 Optical recording medium, 11, 21, 31 Substrate, 121, 122, 221, 222, 223, 321, 322, 323, 324 Recording layer, 131a, 131b, 132a, 132b, 231a, 231b, 232a, 232b, 233a, 233b, 331a, 331b, 332a, 332b, 333a, 333b, 334a, 334b Dieletric layer, 14, 241, 242, 341, 342, 343 Intermediate layer, 15, 25, 35 Protective layer

The invention claimed is:

1. An optical recording medium, comprising:
    a substrate,
    two to four recording layers, wherein
        at least one or more of the recording layers are specific recording layers having a composition containing PdO, $PdO_2$ and at least one of completely oxidized In, Zn, Al and Sn, and wherein
        adjacent to the specific recording layers, In/Al oxide layers containing at least either In or Al as a main component are disposed.

2. The optical recording medium according to claim 1, wherein the In/Al oxide layers are disposed adjacent to both bottom layers and top layers of the specific recording layers.

3. The optical recording medium according to claim 1, wherein one or more of the recording layers are the specific recording layers except for a layer opposite to a light incident side for recording.

4. The optical recording medium according to claim 1, wherein the recording layers have a recording capacity of 25 GB or more per one layer with a light wavelength for recording of 405 nm and a numerical aperture NA of 0.85 of a collecting lens for an optical system.

5. The optical recording medium according to claim 1, wherein the recording layers are three or more, and wherein the recording layers have a recording capacity of 30 GB or more per one layer with a light wavelength for recording of 405 nm and a numerical aperture NA of 0.85 of a collecting lens for an optical system.

6. The optical recording medium according to claim 1, wherein the In/Al oxide layers are InSnO layers or InSiZrO layers.

7. The optical recording medium according to claim 1, wherein the specific recording layers contain Zn and W, and wherein oxide layers containing In as a main component are disposed adjacent to the specific recording layers.

8. The optical recording medium according to claim 7, wherein the oxide layers containing In as the main component adjacent to the specific recording layers are InSnO layers or InSiZrO layers.

9. The optical recording medium according to claim 1, formed in the shape of a disc.

10. The optical recording medium according to claim 9, wherein the disc has a thickness of about 1.1 millimeters.

11. The optical recording medium according to claim 1, formed in the shape of a card.

12. The optical recording medium according to claim 1, further comprising a light-permeable intermediate layer between two recording layers.

13. The optical recording medium according to claim 12, wherein the light-permeable intermediate layer comprises a curable resin.

14. The optical recording medium according to claim 12, wherein the light-permeable intermediate layer has a thickness that inhibits cross-talk between the two recording layers to within a predetermined value.

15. The optical recording medium according to claim 1, further comprising a curable resin protective layer disposed on a light-incident side of the optical recording medium.

16. The optical recording medium according to claim 15, further comprising a hard coat disposed on a surface of the curable resin protective layer.

17. The optical recording medium according to claim 1, wherein one of the In/Al oxide layers is up to 30 nanometers thick.

18. The optical recording medium according to claim 17, wherein thicknesses of two of the In/Al oxide layers on either side of a recording layer are the same.

19. The optical recording medium according to claim 17, wherein thicknesses of two of the In/Al oxide layers on either side of a recording layer are different.

* * * * *